(12) United States Patent
Lamontagne et al.

(10) Patent No.: US 6,313,853 B1
(45) Date of Patent: Nov. 6, 2001

(54) MULTI-SERVICE USER INTERFACE

(75) Inventors: Doris Lamontagne, Nepean; Scott T. Smith, Kanata; Jim Bee, Kanata; Shaun Illingworth, Kanata; François Blouin, Kanata; Brian Thompson, Ottawa, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/060,713

(22) Filed: Apr. 16, 1998

(51) Int. Cl.⁷ .......................................... G06F 9/00
(52) U.S. Cl. .......................... 345/762; 345/863; 345/156
(58) Field of Search ..................... 345/156, 157, 345/145, 330, 331, 333, 334, 335, 351, 357, 358, 172, 173, 179, 329, 753, 751, 762, 733, 854, 863

(56) References Cited

U.S. PATENT DOCUMENTS

| 4,987,411 | * | 1/1991 | Ishigami | 345/156 |
| 5,272,470 | * | 12/1993 | Zetts | 345/173 |
| 5,347,306 | * | 9/1994 | Nitta | 348/15 |
| 5,570,113 | * | 10/1996 | Zetts | 345/173 |
| 5,594,859 | * | 1/1997 | Palmer et al. | 345/330 |
| 5,627,978 | * | 5/1997 | Altom et al. | 345/330 |
| 5,764,222 | * | 6/1998 | Shieh | 345/333 |

FOREIGN PATENT DOCUMENTS

| 04/134292 | * | 4/1992 | (JP) | G06F/15/70 |
| 05/207358 | * | 8/1993 | (JP) | G06T/9/20 |

* cited by examiner

*Primary Examiner*—Cao H. Nguyen
(74) *Attorney, Agent, or Firm*—Finnegan, Henderson, Farabow, Garrett & Dunner, L.L.P.

(57) ABSTRACT

A multi-service user interface that facilitates access to and exchange of information between two or more people when communicating remotely over a broadband network. The interface allows users to move data on a display using gesture motions. Each gesture motion corresponds to a predetermined function. In addition, the interface includes visible reactive zones where a user can move data to implement a specific activity such as, sending a message to another person over the network or removing certain data from the display.

49 Claims, 8 Drawing Sheets

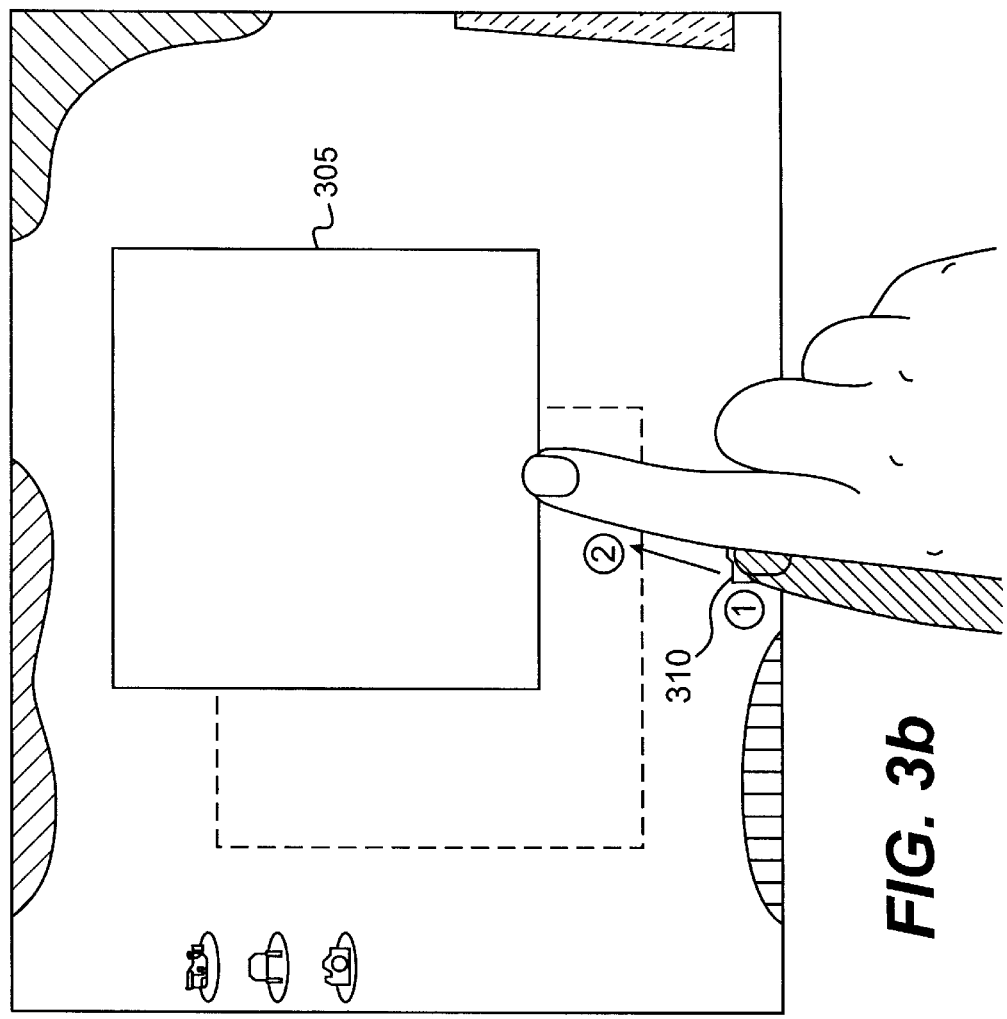

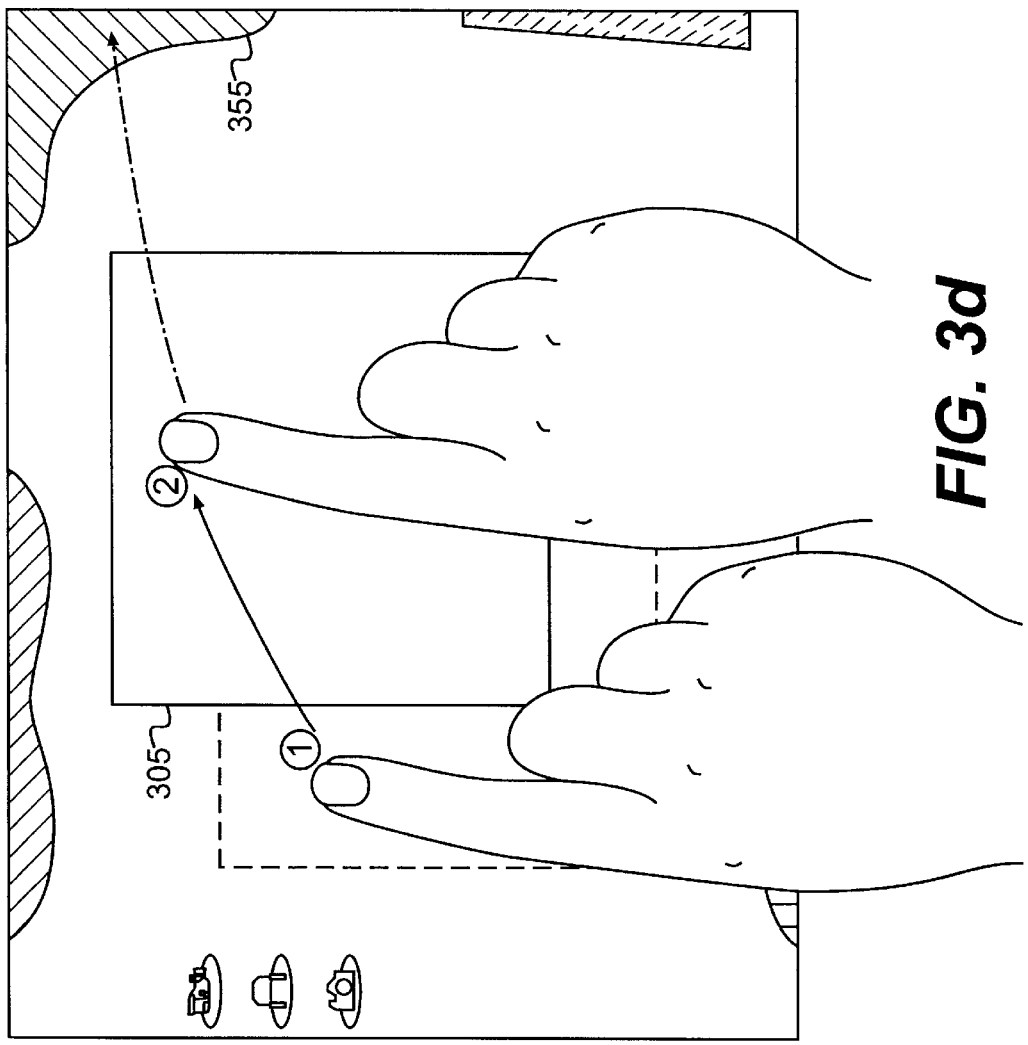

MULTI-SERVICE USER INTERFACE

BACKGROUND OF THE INVENTION

The present invention relates generally to a graphical user interface, and more particularly to a multi-service user interface that facilitates access to and exchange of information between two or more people when communicating remotely over a broadband network.

With the recent advancements in technology, the need for developing graphical user interfaces (GUIs) to allow users to interact with the technology is readily apparent. Examples of GUIs include windows and icons typically employed in a computing environment to provide quick file access or program execution. GUIs employ graphical images (e.g., icons) that represent one or more functions. For example, an envelope icon displayed on a computer screen when a user logs onto the Internet typically indicates that the user has received a new e-mail message. In this instance, the user simply uses a mouse or other pointing device to click on the envelope icon to retrieve the e-mail message (e.g., from an Internet Service Provider's (ISP's) server). This eliminates the need to use pull-down menus or manually dial an ISP's server to retrieve the voicemail message.

Communication systems currently available in the marketplace could benefit from the convenience of GUIs. For example, video conferencing systems which typically include complex architecture would be much easier to operate with a GUI. These systems utilize terminals installed at remote locations to allow multiple parties to communicate both orally and visually over a network. Typically, each location in a video conference includes a camera and a monitor. The camera captures an image at its location and sends the image to other locations participating in the video conference. The monitor at each location receives and displays images captured from the remote cameras. In addition, a voice communication link operates with the video images to transmit voices of the participants simultaneously with the video image. Although this video conferencing configuration allows multiple parties to see and hear each other over a network, the setup is not ideal in environments where the parties need to maintain eye contact while exchanging electronic documentation (e.g., such as in telemedicine environments). One solution is to develop a GUI that allows video conference participants to maintain eye contact while exchanging information.

Current GUIs typically employ a layered menu interface. This interface includes multiple menus that prompt the user to respond to each menu in order to access desired information. The layered menu interface, however, requires the user to manually scroll through menus and icons during the video conference, thus making it difficult to maintain eye contact with other parties to the conference. For example, in a video conference between a medical specialist and a patient, the medical specialist will need to control the flow of human interaction between the remote locations during the session. If the medical specialist is required to continuously scroll through and respond to electronic menus during the session merely to exchange information with the patient, valuable video conferencing time is wasted on mechanical control and the flow of human interaction is lost.

Another problem associated with current GUIs used in video conferencing systems is the limit on available network channels that carry video, voice, data, and audio between remote terminals, as well as the limited quality of service associated with each network channel. These limitations can undesirably affect the quality of the video conference by restricting the use of multimedia devices.

Therefore, it is desirable to provide an improved user interface for a video conferencing environment that is simple to use and operate.

It is also desirable to provide an improved user interface that allows users to control the flow of human interaction during a video conference.

It is further desirable to provide an improved user interface that facilitates the creation and exchange of electronic documentation during a video conference.

It is also desirable to provide an interface that supports a variety of multimedia devices and controls the costs associated therewith during the video conference.

Additional desires, features and advantages of the invention are set forth in the following description, apparent from the description, or may be learned by practicing the invention.

SUMMARY OF THE INVENTION

Systems and methods consistent with the present invention meet these desires by providing a multi-service user interface that facilitates access to and exchange of information between two or more people when communicating remotely over a broadband network.

Specifically, a multi-service user interface comprises a memory for storing a plurality of data; a display in communication with the memory for displaying the plurality of data; a graphical user interface means for enabling a user to move the plurality of data on the display using a gesture motion in the direction of a predetermined area of the display, the direction of the gesture motion corresponding to a predetermined function; and a processor for implementing the predetermined function when the plurality of data is motioned toward the predetermined area of the display.

A method for implementing a multi-user service interface comprises the steps of generating a graphical user interface on a display responsive to a plurality of gesture motions from a user and having a plurality of predetermined areas, each area corresponding to a predetermined function; displaying a plurality of data on the display; moving the plurality of data on the display in the direction of one of the plurality of predetermined areas in response to a gesture motion; and executing the predetermined function corresponding to the predetermined area to which the plurality of data is directed.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings:

FIG. 3b illustrates a method of using a gesture motion to open an electronic file on the multi-service user interface consistent with the present invention;

FIG. 3d illustrates a method of using a gesture motion to send data displayed on the multi-service user interface to a reactive zone consistent with the present invention;

DETAILED DESCRIPTION OF THE INVENTION

Reference will now be made in detail to the construction and operation of preferred embodiments consistent with the present invention illustrated in the accompanying drawings. In those drawings, like elements and operations are designated with the same reference numbers.

Embodiments consistent with the present invention are directed to a multi-service user interface that provides a simple and effective way to manipulate and exchange information between two or more parties communicating remotely over a broadband network. For example, one party to a video conference can send messages to other conference participants using gesture motions on an interface display. The party could use an upward gesture motion across the surface of the display with their finger to send a message and a downward gesture motion to save the message to memory. The multi-service user interface can be used for a variety of applications and in a multitude of environments.

Figure 1:
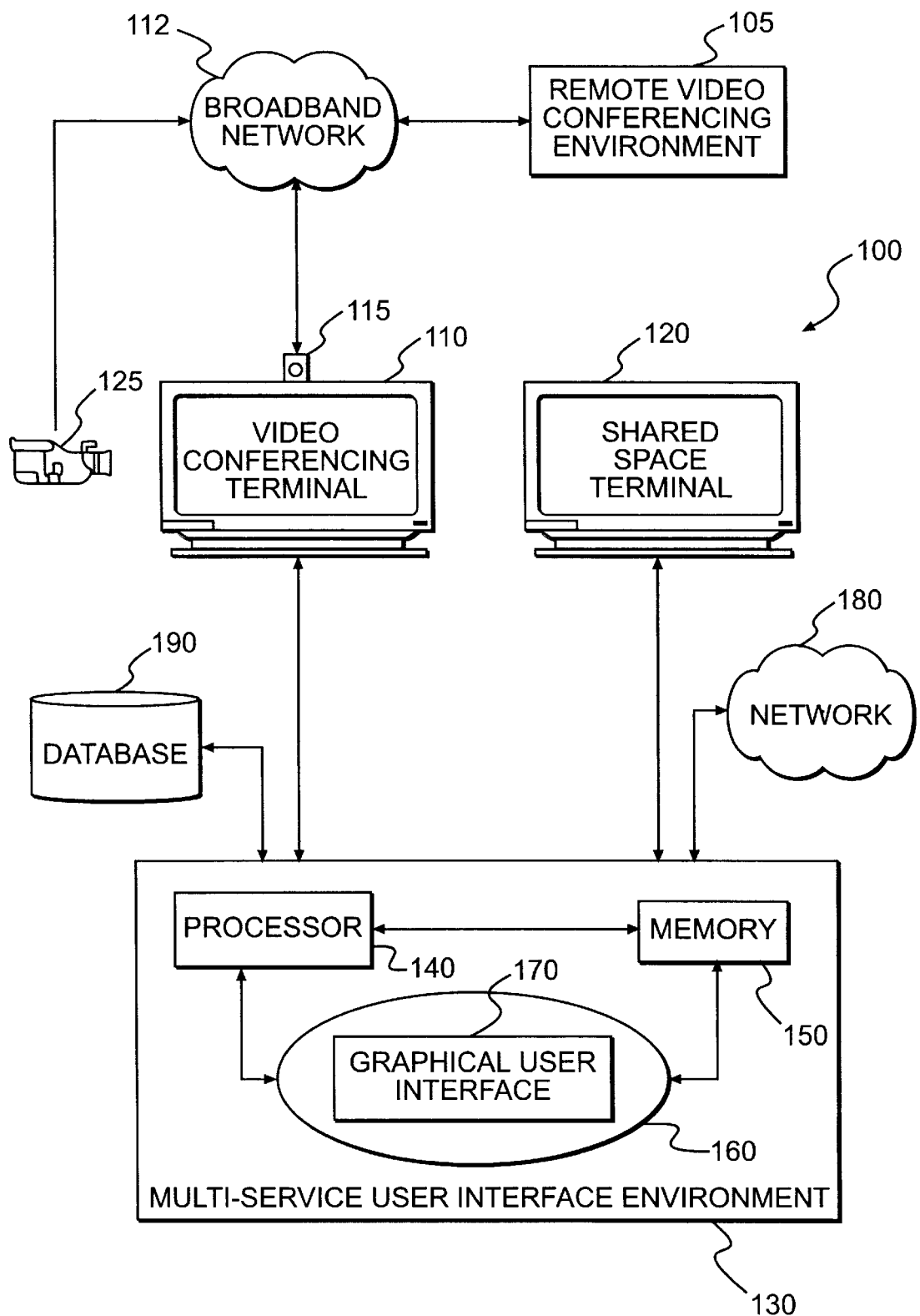
FIG. 1 illustrates a video conferencing system with a multi-service user interface environment consistent with the present invention.

FIG. 1 shows a video conferencing system 100 consistent with the present invention. Video conferencing system 100 facilitates access to and the exchange of information between two or more people (e.g., a patient and a remote medical specialist) communicating at a distance over a broadband network 112. To accomplish this function, video conferencing system 100 includes a remote video conferencing environment 105 located at a remote site, and a video conferencing terminal 110, a shared space terminal 120, a video camera 125, and a multi-service user interface environment 130 located at a local site.

Remote video conferencing environment 105 is remotely located from the other components of video conferencing system 100, e.g., on another floor of the same building or in a different country. Remote video conferencing environment 105 includes conventional hardware and software components necessary to establish a video conference. These components may include a monitor, a video camera, and a communication device (not shown). The monitor allows a remote user to view one or more parties participating in the video conference at another location. The video camera transfers visual images of the remote user to other participants in the video conference. The communication device allows the user to send and receive video and audio signals. These signals allow the remote user to hear and see the other video conference participants and vice versa. One skilled in the art will appreciate that other components, such as a computer terminal, may be added to the basic configuration of remote video conferencing environment 105 to provide more video conferencing features and options to the remote user.

A local user communicates with a remote video conference environment 105 user through video conferencing terminal 110 connected to broadband network 112. This terminal allows the local user to see visual images and hear audio signals from the remote user. Video conferencing terminal 110 further includes a video camera 115 that captures and transfers visual images of the local user to a monitor in remote video conferencing environment 105.

Shared space terminal 120 is a monitor that allows a local user to share information with the remote user. For example, if a local medical specialist wanted a remote patient to view an electronic document image, the specialist can open the document on the screen of shared spaced terminal 120. The remote patient receives the document image through video camera 125 which is focused on shared space terminal 120. Any information the medical specialist wishes to share with the remote patient can be displayed on the screen of shared space terminal 120. The medical specialist can also hold objects or other items in front of video camera 125 for viewing by the remote user. This feature provides a variety of video conferencing options for the medical specialist when relaying information to the remote patient.

Multi-service user interface environment 130 controls video conferencing terminal 110 and shared space terminal 120 during a video conference. To provide such control, multi-service user interface environment 130 includes a processor 140, a memory 150, and a user interface pad 160.

Processor 140 is a conventional high-speed processor, such as a Pentium II or Power PC, that is capable of executing complex software applications. Processor 140 controls each component of multi-service user interface environment 130 and other components of video conferencing system 100 connected to multi-service user interface environment 130.

Memory 150 is preferably a random access memory (RAM) that stores data used in multi-service user interface environment 130. In addition to data, memory 150 can store one or more software applications implemented in multi-service user environment 130 (e.g., graphics software). To facilitate this operation, memory 150 communicates with processor 140 and user interface pad 160 to run applications in multi-service user environment 130.

User interface pad 160 is a device that allows a user to control a video conference. To provide such control, user interface pad 160 preferably includes a display 170 having a screen that allows a local user to view textual and graphical information. A graphical user interface operates on display 170 to allow a local user to manipulate textual and graphical information (e.g., create documents, retrieve files, scroll through text, send messages, etc.). User interface pad 160 can be any commercially available interface pad, such as a Fujitsu Stylistic 1200 system, that is adaptable to perform in a manner consistent with the present invention.

Multi-service user interface environment 130 can communicate with a network 180 to share information during a video conference. For example, a medical specialist may wish to send an e-mail over a local area network to a colleague or access the Internet to retrieve information pertinent to the session. Network 180 can be any network that supports the transfer of data between two or more terminals. Multi-service user interface environment 130 can also communicate with a database 190 to access and retrieve information during a video conference. For example, a medical specialist may wish to retrieve a patient's records during a telemedicine session to diagnose a recurring symptom. With network 180 and database 190, the medical specialist has access to a variety of information during the video conference to aid in diagnosing the patient's medical problem.

Figure 2:
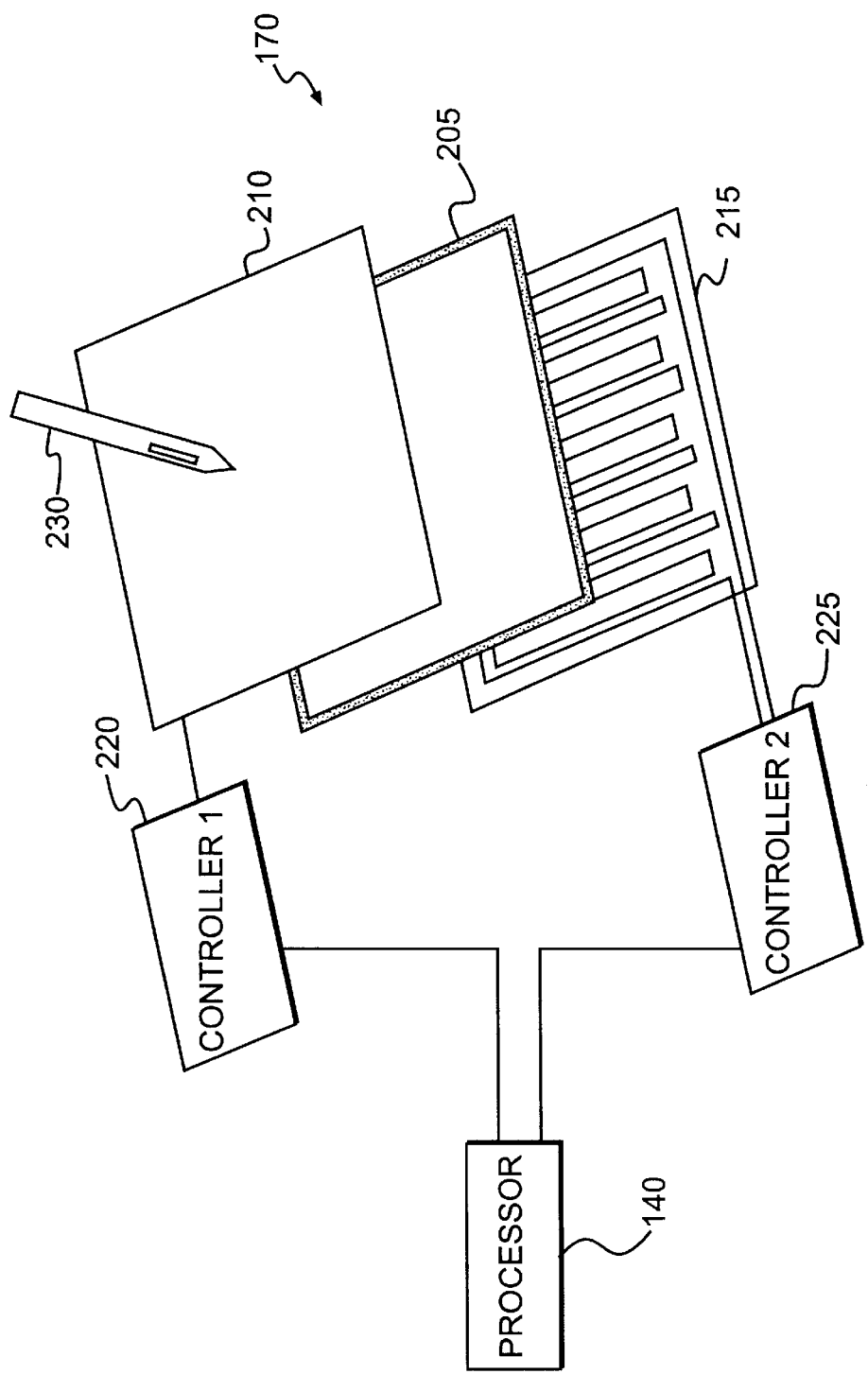
FIG. 2 illustrates a display that is responsive to human touch and a pen input device consistent with the present invention.

FIG. 2 illustrates display 170 of multi-service user interface environment 130 consistent with the present invention. Display 170 is configured to respond to different input devices, such as a human touch or a pen input device. The response of display 170 can be different depending on the input device of the user. For example, the user can electronically write text or draw sketches on display 170 with the pen input device, however, the display may not respond to an attempt to write text or draw sketches using a human finger. The ability to detect and distinguish between input devices is provided by a liquid crystal display (LCD) 205, an analog resistive touch screen 210, a sensor board 215, a first controller 220, and a second controller 225.

LCD 205 is positioned between analog resistive touch screen 210 and sensor board 215 as illustrated in FIG. 2. Analog resistive touch screen 210 is a detector used to determine finger and pen input device locations with respect to display 170. A voltage gradient is applied to analog resistive touch screen 210 to detect finger and pen location on display 170. Controller 220 detects the actuation of a human finger or pen on analog resistive touch screen 210 and locates a position based on the voltage present at the point of actuation. Sensor board 215 is a detector used to determine the location of a pen 230 with respect to display 170. Sensor board 215 transmits a RF signal that is detected by the pen when adjacent to display 170. Pen 230 has a resonant circuit that causes a phase shift to occur to the transmitted signal indicating that the pen is in an active zone. Controller 225 determines the location of pen 230 based on signal strength and phase shift. Each of controllers 220 and 225 are operated by processor 140 to provide a completely integrated system. In addition, a variety of currently available software applications may be used in conjunction with described input devices for operation (e.g., Microsoft Pen OS). One skilled in the art will appreciate that multiservice user interface environment 130 may include other input devices, such as a voice recognition input device, for use with display 170 to permit data manipulation.

Figure 3A:
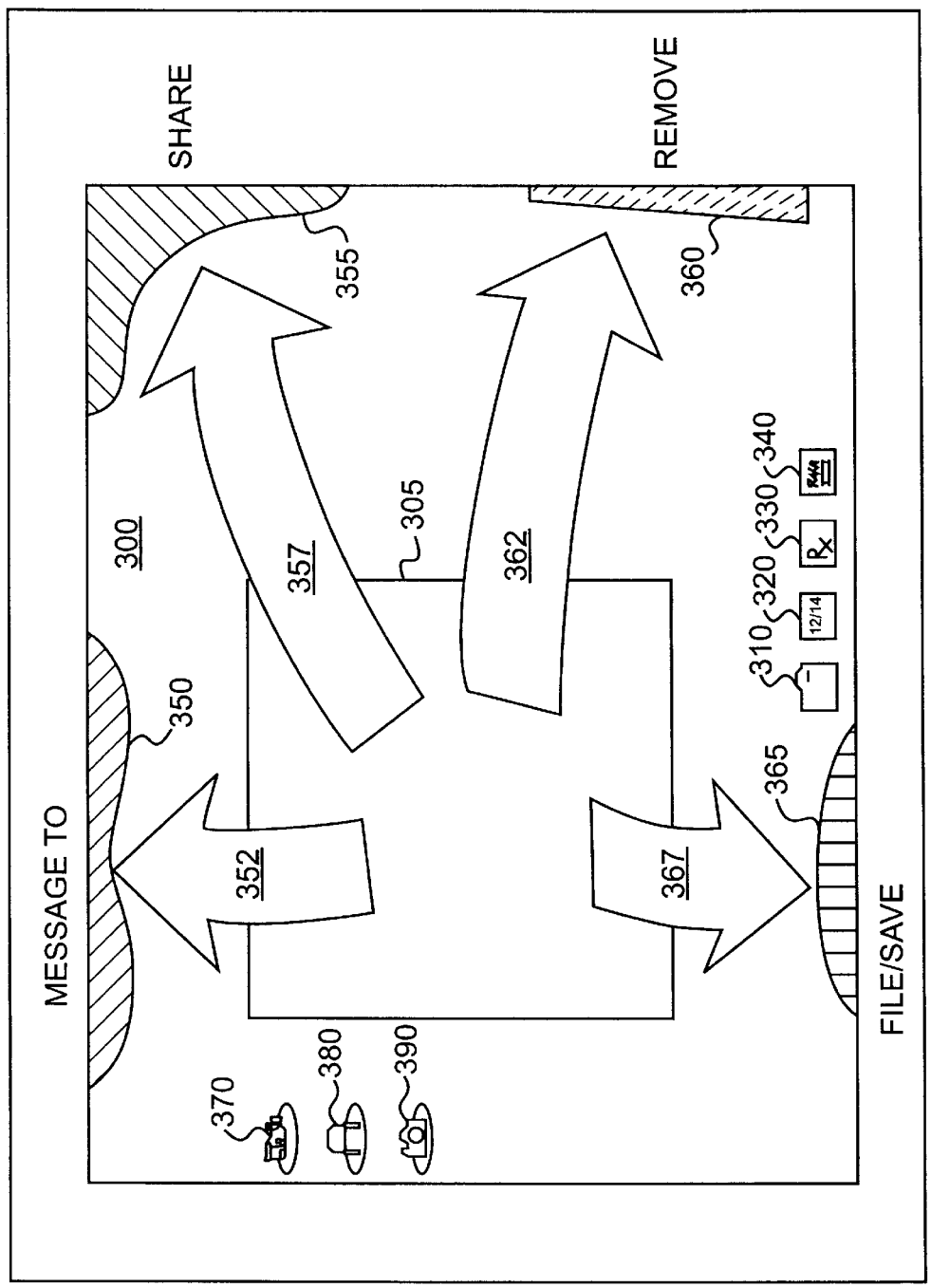
FIG. 3a illustrates a multi-service user interface with a plurality of visible zones and icons consistent with the present invention.

FIG. 3a illustrates a multi-service graphical user interface (GUI) 300 consistent with the present invention. GUI 300 operates on display 170 of user interface pad 160 and allows a user to view and manipulate a plurality of data 305. Data 305 may be an electronic textual document, such as patient information or notes, or a graphic image, such as an x-ray or a visual image of a patient injury. Data 305 can be retrieved from memory 150, network 180, database 190, or can be generated by the user using one or more of a file icon 310, schedule icon 320, prescription icon 330, and notepad icon 340.

File icon 310 corresponds to an operation for retrieving one or more files from a source (e.g., memory 150, database 190, or network 180). FIG. 3b illustrates how files are retrieved using file icon 310. First, the user touches file icon 310 with an input device (e.g., finger) which displays a menu of data files. The user can then select a particular file with the input device. The selected file is then opened as a window on display 170. The user can then position the data file by moving the input device across the surface of display 170 using a gesture motion from position "1" to position "2," as illustrated in FIG. 3b. Preferably, during a telemedicine session, a medical specialist can only open the file of a patient who is at the remote location. This feature prevents a medical specialist from inadvertently sharing confidential information from another patient's file with the remote patient, thus adding safety and security to the telemedicine session.

Schedule icon 320 corresponds to an operation for retrieving a daily schedule for a user. In a telemedicine environment, for example, medical specialists can view their daily schedules by simply touching schedule icon 320 on display 170, followed by a gesture motion maintaining contact with the surface of display 170, similar to that described for file icon 310. Schedules may be indexed for each medical specialist. In this case, touching schedule icon 320, followed by the gesture motion, can open a menu listing each medical specialist by name. Each medical specialist can then select their name by touching it on the display to open their daily schedule. One skilled in the art will appreciate that other methods of opening a specialist's schedule or any other electronic file may be used. For example, a specialist can open her schedule for a particular patient by speaking the patient's name into a voice recognition input device or touching the patient's name from a menu. In addition, the specialist can be required to use an access code or other security device (e.g., voice recognition) to access her schedule or other sensitive information.

Prescription icon 330 corresponds to an operation that allows a user to write prescriptions for a patient. For example, during a video conference with a patient, a medical specialist can touch this icon with their finger (or other input device) and use a subsequent contact gesture motion similar to that described for the file icon to open an electronic prescription template. The medical specialist can then write out a prescription using a pen input device. Once the prescription is complete, the medical specialist can send the prescription to the patient or directly to a pharmacy using techniques described below. This feature of the multi-service user interface is specific to a telemedicine environment. One skilled in the art will appreciate that other icons specific to other environments may be used to perform unique operations for the user.

Notepad icon 340 corresponds to an operation that allows the user to generate text (e.g., notes) and graphics (e.g., sketches) using a pen input device. If, for example, a medical specialist wishes to make notes to an electronic patient file, they can touch notepad icon 340 and use a gesture motion similar to that described for the file icon to open an electronic notepad. The medical specialist can then take notes using the pen input device with display 170.

Figure 3C:
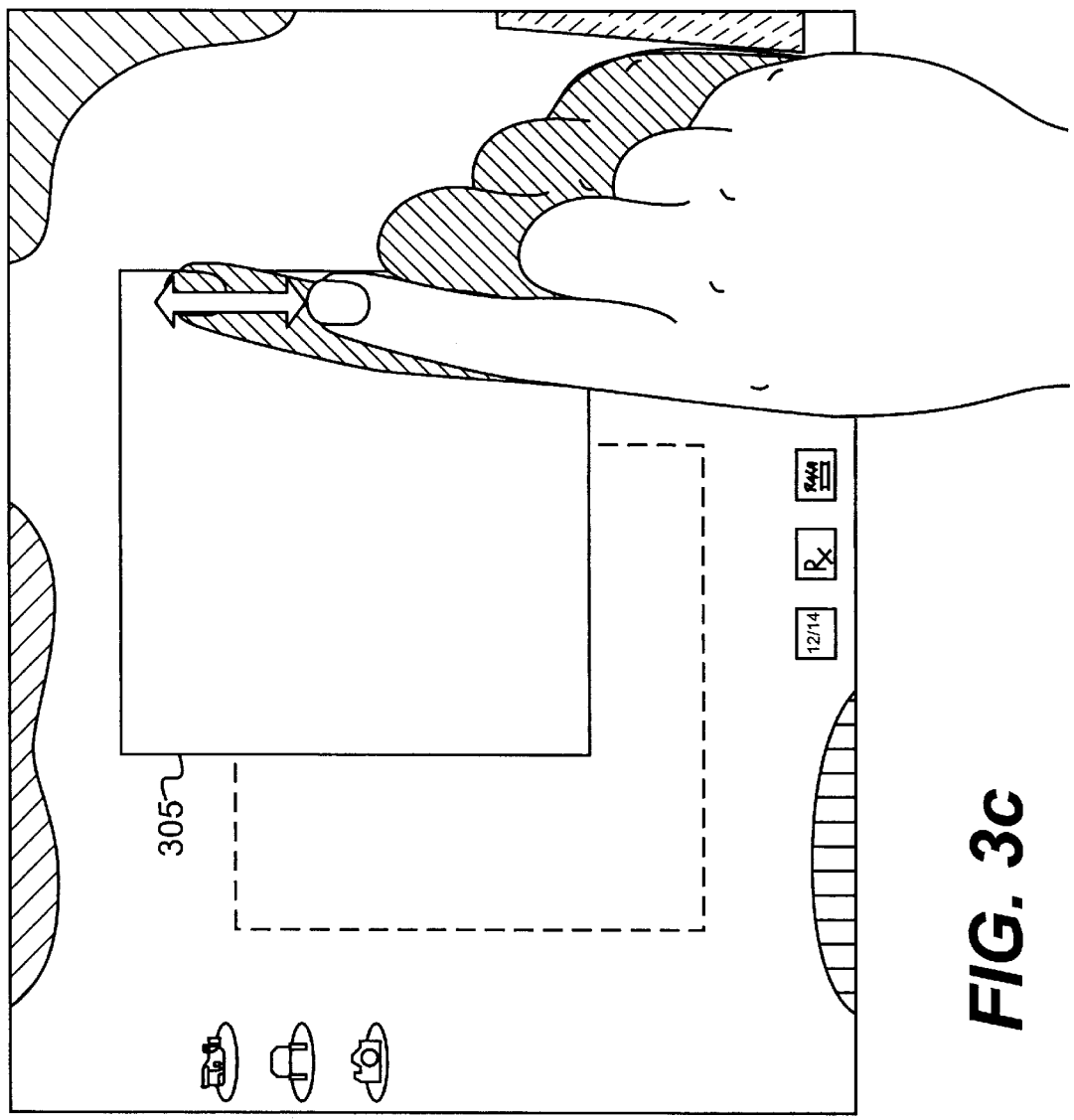
FIG. 3c illustrates a method of using a gesture motion to scroll through data displayed on the graphical user interface consistent with the present invention.

Once data 305 is opened onto display 170 using one of the foregoing techniques, the user can manipulate the data. For example, if a patients file is five pages in length when opened on display 170, the medical specialist can scroll through the pages of the file using contact gesture motions. FIG. 3c illustrates how a user can scroll through multiple pages using a human finger as an input device. In this figure, the user simply touches a portion of data 305 on the display and makes an upward gesture motion maintaining contact with the surface of display 170. Preferably, the upward gesture motion causes data 305 to glide upward across the screen until the following page is displayed. To scroll backward through the pages, the user simply makes a downward gesture motion as also illustrated in FIG. 3c. The gesture motions can be short in length, thus adding to the simplicity of GUI 300.

Although use of a touch pad for display 170 requires that a gesture motion include continuous contact with the surface of display 170, other types of displays do not require contact, but merely that the input device be in proximity to the surface. Thus, a gesture motion can be accomplished by movement of the input device in the desired direction while in proximity, but not in contact with the surface of display 170.

A user can manipulate data on display 170 using a variety of predefined functions. As shown in FIG. 3a, GUI 300 provides these functions using a plurality of programmable, visible reactive zones 350, 355, 360, and 365, preferably widely separated on display 170, to maintain distinctiveness. GUI 300 can be configured with more or less reactive zones depending on the application environment. Visible reactive zones 350, 355, 360, and 365 are predetermined areas on display 170 that correspond to different functions. For example, message reactive zone 350 corresponds to a messaging function, share reactive zone 355 corresponds to a "send to shared space" function, remove reactive zone 360 corresponds to a remove function, and save reactive zone 365 corresponds to a file/save function. Each reactive zone has visibly distinguishing features, such as distinct shape, color, and texture, relative to the other reactive zones. For example, zone 350 may be green, 355 red, 360 silver, and 365 yellow. The distinguishing features of each reactive zone, plus the wide separation, allows a user to implement the functions associated with each zone using peripheral vision. This is important when the user wishes to maintain eye contact with a remote video conference participant while manipulating data using GUI 300.

Message reactive zone 350 corresponds to a messaging function that allows a user to send messages and other electronic documentation to remote participants in a video conference. Preferably, a user moves data 305 in the direction of arrow 352 using a gesture motion with either a human finger or a pen input device. This gesture motion causes data 305 to glide into message zone 350 wherein processor 140 implements the messaging function. GUI 300 can be configured to execute one or more functions corresponding to a reactive zone (e.g., message reactive zone 350) when data 305 touches, overlaps, or is within a predetermined proximity of the reactive zone.

The messaging function includes sending data 305 over a broadband network connecting the local video conferencing environment and one or more remote video conferencing environments. Preferably, the network is a multi-service broadband network that handle multiple quality of service and authority levels (e.g., ATM or Webtone RSVP). Multiple quality of service levels allow the local user to choose a quality of service for transferring messages over the network, while multiple authority levels allow the local user to prioritize messages sent over the network. When transferring a message to a remote participant using message reactive zone 350, GUI 300 instructs the network of the parameters for quality of service and authority levels. Preferably, the quality of service and authority levels are set for the user by a system administrator. However, the user may be permitted to set the quality of service and authority levels for each message sent over the network during a video conference. This can be accomplished using pull-down menus, voice recognition input devices, or other types of interfaces. In addition, GUI 300 can be configure to associate a default quality of service and authority level with each message sent over network. These parameters can be automatically set when the video conference is initiated. Configuring quality of service and authority levels when initiating a video conference allows the user to control and account for bandwidth related costs for each session.

Share reactive zone 355 allows a user to send data 305 to shared space monitor 120. This feature allows the user to share data 305 with other parties to the video conference. To send data 305 to the shared space monitor, the user makes a gesture motion across display 170 on its surface in the direction of arrow 357 using an input device. The gesture motion of the user from position "1" to position "2" causes data 305 to glide towards share reactive zone 355, as shown in FIG. 3d. When data 305 glides into share reactive zone 355, processor 140 implements the "send to shared space" function. The technique illustrated in FIG. 3d for moving data to share reactive zone 355 is preferably used to move data to each reactive zone on display 170.

Remove reactive zone 360 allows a user to remove data 305 from display 170. This feature allows the user to clear information from display 170 during the video conference without deleting the information from memory. To remove data 305 from display 170, the user makes a gesture motion across display 170 in the direction of arrow 362 using an input device. When data 305 glides into remove reactive zone 360, processor 140 implements the remove function.

Save reactive zone 365 allows a user to save files on display 170 to memory. This feature allows the user to save preexisting data (e.g., patient medical file) or newly generated data (e.g., prescription). To save data 305, the user makes a gesture motion across display 170 in the direction of arrow 367 using an input device. When data 305 glides into save reactive zone 365, processor 140 implements the save function.

GUI 300 further includes icons representing multimedia functions that can be implemented during a video conference. Preferably, data created during the implementation of these multimedia functions automatically attach to a patient's file in a telemedicine session (e.g., images, sound, text). In FIG. 3a, particular multimedia functions that can be implemented during a telemedicine session are represented by a video icon 370, a headphones icon 380, and a camera icon 390.

Figure 3E:
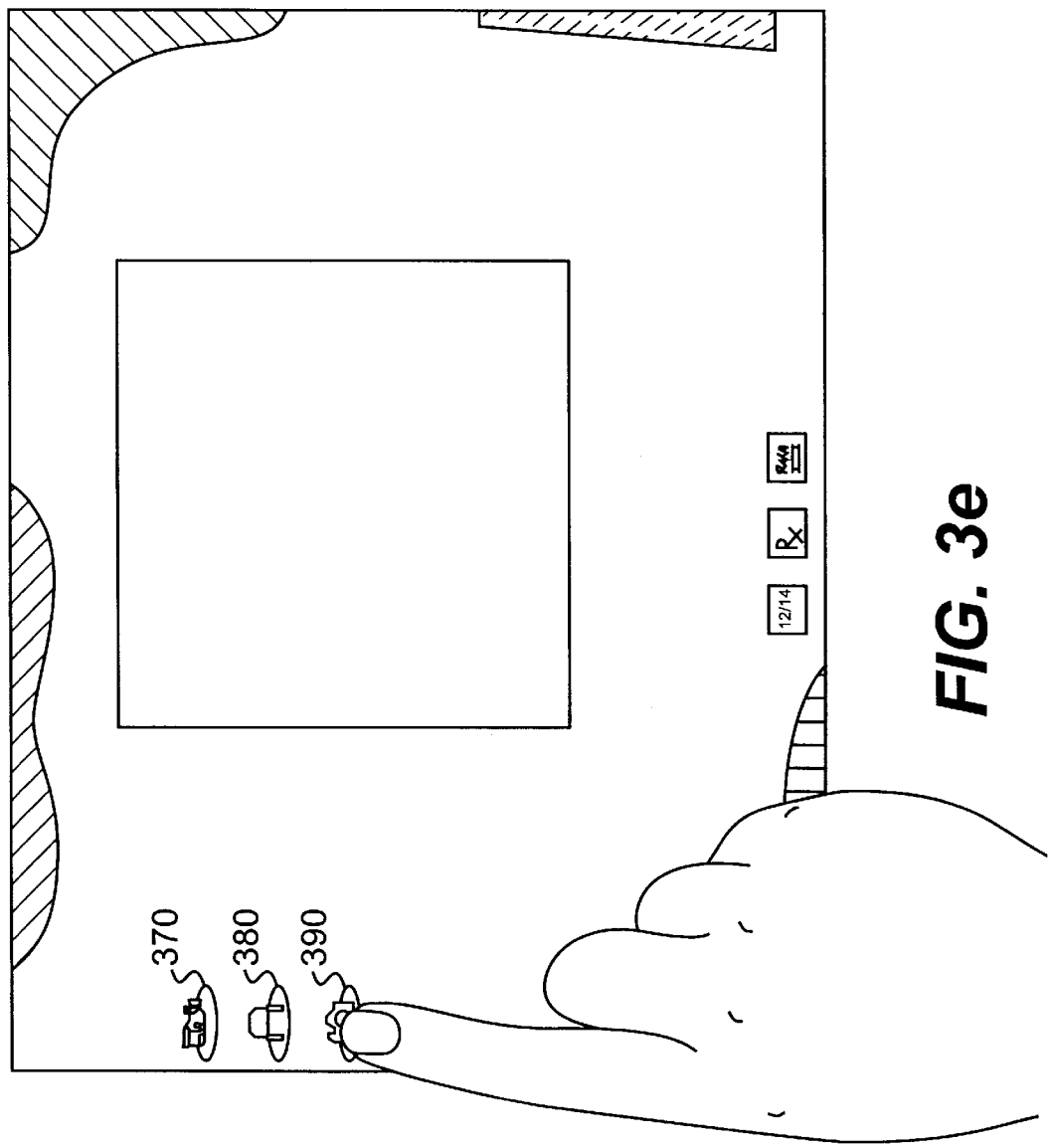
FIG. 3e illustrates a method of activating a photographic function that generates pictures during a video conference consistent with the present invention.

Video icon 370 corresponds to a video recording function that allows a user to digitally videotape a video conference. To implement this function, the user preferably touches video icon 370 in a manner similar to that shown in FIG. 3e. By touching video icon 370, processor 140 implements the video recording function. In this instance, GUI 300 opens an additional video channel over the broadband network at a bandwidth and quality of service predetermined by the user. Thus, during a telemedicine video conference, a medical specialist can record visual images of the patient throughout the session and review these images at a later time.

Headphones icon 380 corresponds to an audio recording function that allows the user to record the audio portion of the video conference (i.e., using a digital or analog audio recorder). To implement this function, the user preferably touches headphones icon 380 in a manner similar to that shown in FIG. 3e. By touching headphones icon 370, processor 140 implements the audio recording function. Therefore, during a telemedicine session, a medical specialist can record any sounds generated in the remote location (e.g., a patient's heartbeat, breathing, or voice) and listen to these sounds at a later time.

Camera icon 390 corresponds to an photographic function that allows the user to take still pictures of a patient during a video conference. To implement this function, the user preferably touches camera icon 390 in a manner similar to that shown in FIG. 3e. By touching camera icon 370, processor 140 implements the photographic function, saving a still image of the patient video currently being displayed. The photographic function can be programmed to "take photographs" at periodic intervals or each time the user touches camera icon 390.

GUI 300 can be configured to provide additional options to a user. For example, when a user touches an icon or makes a gesture motion to a reactive zone, GUI 300 can be programmed to provide a confirmation display to the user before implementing each function (e.g., "Are you sure you want to remove this file?"). The confirmation display prevents the possibility of implementing one or more functions by accident. In addition, the reactive zones and icons can be modified and arranged on a display in a manner that best conforms to a user's peripheral vision. For example, the user may like the color blue, red, green, and yellow for the reactive zones and may wish to arrange the zones on the left side of the display because they are left-handed. GUI 300 allows the user to make such a configuration. An advantage in using such a configuration is that the user (e.g., medical specialist) can view the reactive zones using peripheral vision, and move data to each zone without losing eye contact with the remote user (e.g., patient). Moreover, by using gesture motions to move data to these different zones, the user develops kinesthetic memory resulting in a natural gesture movement to manipulate data on display 170. These qualities of GUI 300 improve the flow of the remote interaction (e.g., telemedicine video conference) by allowing the video conference participants to maintain eye contact and presence.

Figure 4:
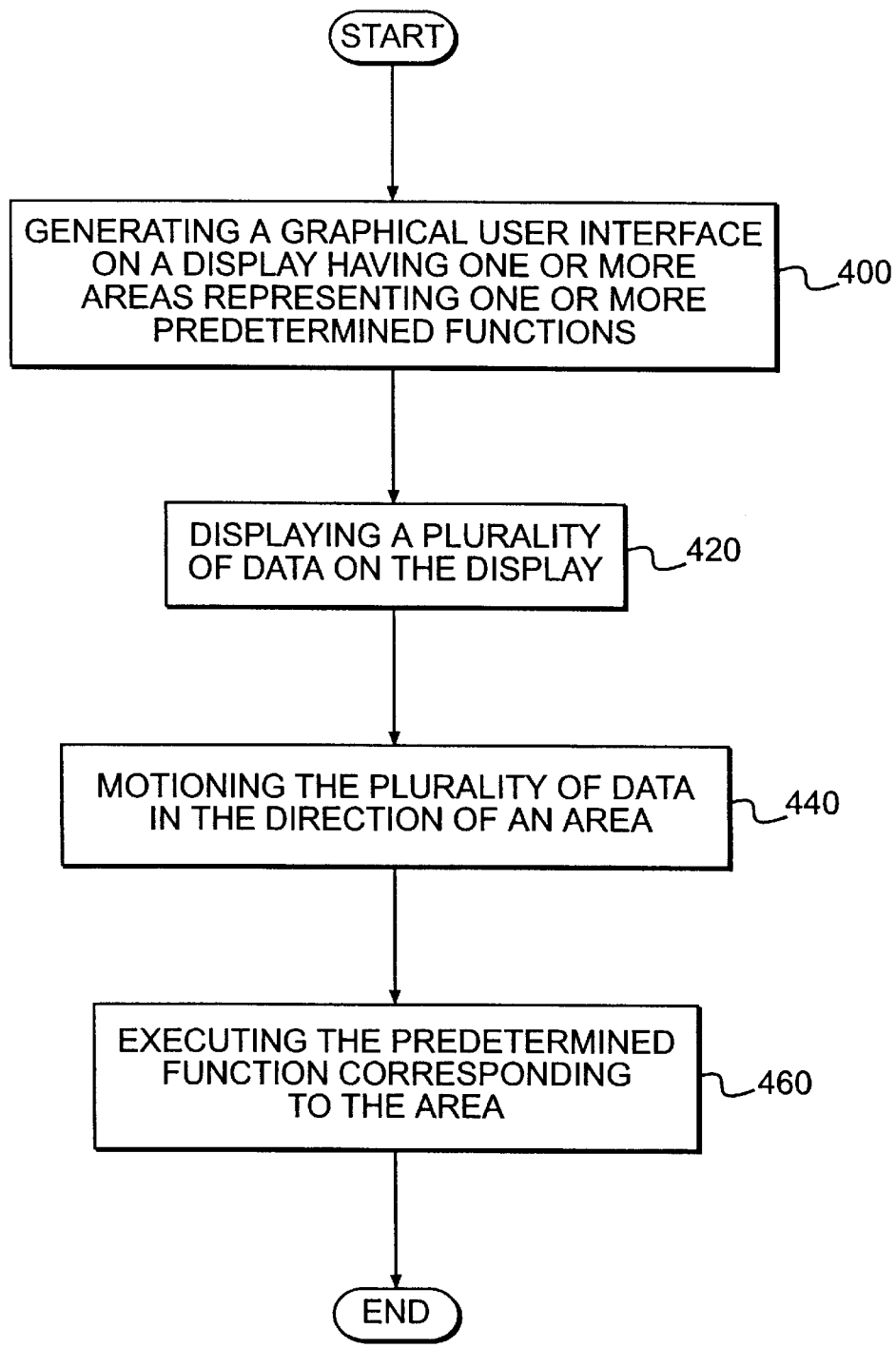
FIG. 4 illustrates a flowchart of a method for implementing a multi-service user interface consistent with the present invention.

FIG. 4 illustrates a flowchart of a method for implementing a multi-service user interface consistent with the present invention. The method begins with generating a GUI 300 on a display having one or more areas representing one or more predetermined functions (step 400). The next step is displaying a plurality of data on the display (step 420). The plurality of data is then moved in the direction of a predetermined area using a gesture motion (step 440) where the predetermined function corresponding to the predetermined area is implemented (step 460).

The multi-service user interface described herein simplifies distance interaction between multiple parties by orchestrating the creation and exchange of data during a video conference session. The reactive zones on the user interface correspond to functions that instruct the video conferencing network where to display documents and other information. In addition, the multi-service user interface allows a user to prioritize events within the video conference session and control bandwidth related costs. Finally, the multi-service user interface can be preconfigured to set quality of service and authority level parameters over a network that supports multiple service levels.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A multi-service user interface, comprising:

a memory for storing a plurality of data;

a display in communication with the memory for displaying the plurality a graphical user interface means for enabling a user to move the plurality of data on the display using a gesture motion in the direction of a predetermined area of the display, wherein the direction of the gesture motion defines the gesture motion and corresponds to a predetermined function, and wherein the predetermined area of the display includes a visible zone that represents the predetermined function such that the visible zone represents a visibly distinctive region of the display; and a processor for implementing the predetermined function when the plurality of data is moved toward the predetermined area of the display.

2. The interface of claim 1 wherein the plurality of data includes textual data.

3. The interface of claim 1 wherein the plurality of data includes graphical data.

4. The interface of claim 1 wherein the graphical user interface means further includes means for displaying an icon representing a predetermined operation.

5. The interface of claim 1 wherein the graphical user interface includes a pen for enabling a user to manipulate the plurality of data and generate textual and graphical images on the display.

6. The interface of claim 5 wherein the pen includes a resonant circuit.

7. The interface of claim 1 wherein the graphical user interface includes a touch-responsive means for enabling a user to position the plurality of data on the display with a human finger.

8. The interface of claim 1 wherein the graphical user interface includes a voice-responsive means for enabling a user to position the plurality of data on the display.

9. The interface of claim 1 wherein the display includes a first controller connected to the processor;

a second controller connected to the processor;

an analog resistive touch screen in communication with the first controller;

a sensor board in communication with the second controller; and a liquid crystal display positioned between the analog resistive touch screen and the sensor board.

10. A video conferencing system in a workspace for communicating with a remote participant at a monitor in a remote location, the system comprising:

a first monitor in the workspace for displaying an image of the remote participant;

a second monitor in the workspace for simultaneously displaying a shared space image showing a view in the remote location;

a memory for storing a plurality of data;

a display in communication with the second monitor and memory for displaying the plurality of data;

a graphical user interface means for enabling a user to move the plurality of data on the display using a gesture motion in the direction of a predetermined area of the display, wherein the direction of the gesture motion defines the gesture motion and corresponds to a predetermined function, and wherein the predetermined area of the display includes a visible zone that represents the predetermined function such that the visible zone represents a visibly distinctive region of the display; and a processor for implementing the predetermined function when the plurality of data is moved toward the predetermined area of the display.

11. The system of claim 10 wherein the plurality of data includes textual data.

12. The system of claim 10 wherein the plurality of data includes graphical data.

13. The system of claim 10 wherein the graphical user interface means further includes means for displaying an icon representing a predetermined operation.

14. The system of claim 10 wherein the graphical user interface includes a pen for enabling a user to position the plurality of data on the display.

15. The system of claim 10 wherein the graphical user interface includes a touch responsive means for enabling a user to position the plurality of data on the display with a human finger.

16. The system of claim 10 wherein the graphical user interface includes a voice responsive means for enabling a user to position the plurality of data on the display.

17. The system of claim 10 further comprising a video camera for displaying the shared space image on the monitor in the remote location.

18. The system of claim 10 further comprising a database in communication with the graphical user interface means.

19. The system of claim 10 further comprising a network in communication with the graphical user interface means.

20. The system of claim 10 wherein the first monitor includes a video camera for displaying the image of the remote participant.

21. The system of claim 10, wherein the visible zone permits the user to maintain eye contact with the remote participant.

22. A method for implementing a multi-user service interface, comprising the steps of:
generating a graphical user interface on a display, the display being responsive to a plurality of gesture motions from a user and having a plurality of predetermined areas, each area corresponding to a predetermined function;
displaying a plurality of data on the display;
moving the plurality of data on the display in the direction of one of the plurality of predetermined areas in response to a gesture motion, wherein the gesture motion is defined by the direction and corresponds to the predetermined function, and wherein the predetermined area of the display includes a visible zone that represents the predetermined function such that the visible zone represents a visibly distinctive region of the display; and
executing the predetermined function corresponding to the predetermined area to which the plurality of data is directed.

23. The method of claim 22 wherein the generating step includes the step of generating a graphical user interface on a display having a visible zone representing a function to send the plurality of data to a remote terminal over a network.

24. The method of claim 23 wherein the generating step includes the step of associating a quality of service level with the function for sending the plurality of data to a remote terminal over the network.

25. The method of claim 22 wherein the generating step includes the step of generating a graphical user interface on a display having a visible zone representing a function to send the plurality of data to a local monitor.

26. The method of claim 22 wherein the generating step includes the step of generating a graphical user interface on a display having a visible zone representing a function to save the plurality of data in an electronic file.

27. The method of claim 22 wherein the generating step further includes the step of generating a graphical user interface on a display having a plurality of icons, each icon representing a predetermined operation.

28. The method of claim 27 wherein the generating step includes the step of generating a graphical user interface on a display having a video icon representing a video recording operation.

29. The method of claim 27 wherein the generating step includes the step of generating a graphical user interface on a display having a headphones icon representing an audio recording operation.

30. The method of claim 27 wherein the generating step includes the step of generating a graphical user interface on a display having a camera icon representing a photographic operation.

31. The method of claim 27 wherein the generating step includes the step of generating a graphical user interface on a display having a folder icon representing a file retrieval operation.

32. The method of claim 27 wherein the generating step includes the step of generating a graphical user interface on a display having a schedule icon representing a scheduling operation.

33. The method of claim 27 wherein the generating step includes the step of generating a graphical user interface on a display having a prescription icon representing a prescription writing operation.

34. The method of claim 27 wherein the generating step includes the step of generating a graphical user interface on a display having a notepad icon representing a note documenting operation.

35. The method of claim 22 wherein the motioning step includes the step of motioning the plurality of data on the display in the direction of one of the plurality of predetermined areas using a human finger.

36. The method of claim 22 wherein the motioning step includes the step of motioning the plurality of data on the display in the direction of one of the plurality of predetermined areas using a human finger in contact with the surface of the display.

37. The method of claim 22 wherein the moving step includes the step of moving the plurality of data on the display in the direction of one of the plurality of predetermined areas using a pen.

38. The method of claim 22 wherein the generating step includes the step of associating an authority level with each of the plurality of predetermined areas.

39. The method of claim 22 wherein the generating step includes the step of associating a bandwidth level with each of the plurality of predetermined areas.

40. A system for implementing a multi-user service interface connected to a network, comprising:
means for generating a graphical user interface on a display responsive to a plurality of gesture motions of an input device from a user and having a plurality of predetermined areas, each area corresponding to a predetermined function;
means for displaying a plurality of data on the display;
means for moving the plurality of data on the display in the direction of one of the plurality of predetermined areas in response to motion of the input device, wherein the gesture motion is defined by the direction and corresponds to the predetermined function, and wherein the predetermined area of the display includes a visible zone that represents the predetermined function such that the visible zone represents a visibly distinctive region of the display; and
means for executing the predetermined function corresponding to the predetermined area to which the plurality of data is directed.

41. The system of claim 40 wherein the generating means include means for generating a graphical user interface on a display having a visible zone representing a function to send the plurality of data to a remote terminal over the network.

42. The system of claim 40 wherein the generating means include means for generating a graphical user interface on a display having a visible zone representing a function to send the plurality of data to a local monitor.

43. The system of claim 40 wherein the generating means include means for generating a graphical user interface on a display having a visible zone representing a function to save the plurality of data in an electronic file.

44. The system of claim 40 wherein the generating means include means for generating a graphical user interface on a display having a plurality of icons, each icon representing a predetermined operation.

45. The system of claim 40 wherein the moving means include means for moving the plurality of data on the display using a human finger.

46. The system of claim 40 wherein the moving means include means for moving the plurality of data on the display using a pen.

47. The system of claim 40 wherein the generating means include means for associating a quality of service level with at least one predetermined area.

48. The system of claim 40 wherein the generating means include means for associating an authority level with at least one predetermined area.

49. The system of claim 40 wherein the generating means include means for associating a bandwidth requirement with at least one predetermined area.

* * * * *

UNITED STATES PATENT AND TRADEMARK OFFICE
CERTIFICATE OF CORRECTION

PATENT NO. : 6,313,853 B1  
DATED : November 6, 2001  
INVENTOR(S) : Doris D. Lamontagne et al.

It is certified that error appears in the above-identified patent and that said Letters Patent is hereby corrected as shown below:

Column 9,  
Line 64, after "plurality" insert -- of data; --.

Signed and Sealed this

Fourteenth Day of May, 2002

Attest:

Attesting Officer

JAMES E. ROGAN  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,313,853 B1 | Page 1 of 1 |
| APPLICATION NO. | : 09/060713 | |
| DATED | : November 6, 2001 | |
| INVENTOR(S) | : Doris Lamontagne et al. | |

It is certified that error appears in the above-identified patent and that said Letters Patent is hereby corrected as shown below:

In the claims

In Column 11, Line 29, In Claim 22, delete "multi-user service" and insert -- multi-service user --, therefor.

In Column 12, Line 48, In Claim 40, delete "multi-user service" and insert -- multi-service user --, therefor.

Signed and Sealed this
Twenty-fourth Day of November, 2015

Michelle K. Lee
*Director of the United States Patent and Trademark Office*